United States Patent
Kwak et al.

(10) Patent No.: US 6,747,092 B2
(45) Date of Patent: Jun. 8, 2004

(54) ALIPHATIC POLYESTER COMPOUNDS HAVING HIGHLY BRANCHED STRUCTURE AS A PLASTICIZER OF POLYVINYLCHLORIDE AND FLEXIBLE POLYVINYLCHLORIDE BLEND CONTAINING THE SAME

(75) Inventors: Seung-Yeop Kwak, Seoul (KR); Jeong-Soo Choi, Seoul (KR)

(73) Assignee: Ecotech Co., Ltd., Chungcheongnam-do (KR)

( * ) Notice: Subject to any disclaimer, the term of this patent is extended or adjusted under 35 U.S.C. 154(b) by 128 days.

(21) Appl. No.: 10/001,205

(22) Filed: Dec. 4, 2001

(65) Prior Publication Data

US 2002/0111406 A1 Aug. 15, 2002

(30) Foreign Application Priority Data

Dec. 7, 2000 (KR) .......................... 2000-74361

(51) Int. Cl.[7] .......................... C08L 27/06; C08L 67/02
(52) U.S. Cl. ...................... 524/569; 524/513
(58) Field of Search ................. 524/569, 513

(56) References Cited

U.S. PATENT DOCUMENTS 5,385,974 A   1/1995  Ohmae et al. ............... 525/58

OTHER PUBLICATIONS

D. Hoelter, et al. *"Degree Of Branching In Hyperbranched Polymers"* Acta Polymerica, 1997, 48, pp. 30–35.

*Primary Examiner*—Peter Szekely
(74) *Attorney, Agent, or Firm*—McDermott, Will & Emery (57) ABSTRACT

The present invention discloses aliphatic polyester compound having highly branched structure for polyvinylchloride plasticizer and polyvinylchloride blend containing the same. Aliphatic polyester compound having highly branched structure for polyvinylchloride plasticizer according to the present invention is formed by self-condensation polymerization of monomer having one carboxy functional group and two hydroxy functional groups. Since such aliphatic polyester having highly branched structure has superior compatibility with polyvinylchloride and never flows out contrary to the conventional liquid plasticizer having low molecular weight of phthalate, etc., the problems such as the disturbance of endocrine system of human body and the destruction of ecosystem due to the efflux of plasticizer is not caused and since the same has superior efficiency of plasticization, it is possible to give polyvinylchloride sufficient flexibility.

7 Claims, 2 Drawing Sheets

ALIPHATIC POLYESTER COMPOUNDS HAVING HIGHLY BRANCHED STRUCTURE AS A PLASTICIZER OF POLYVINYLCHLORIDE AND FLEXIBLE POLYVINYLCHLORIDE BLEND CONTAINING THE SAME

BACKGROUND OF THE INVENTION (a) Field of the Invention

The present invention relates to a plasticizer of polyvinylchloride(PVC, hereinafter) and flexible PVC blend, and more particularly, aliphatic polyester having highly branched structure and flexible PVC blend containing the same, allowing to overcome problems such as the disturbance of endocrine system of human body and the destruction of ecosystem due to the efflux of plasticizer and having superior compatibility with polyvinylchloride and superior efficiency to plasticize, thereby giving polyvinylchloride sufficient flexibility.

(b) Description of the Related Art

PVC is a typical polymer widely used for manufacturing plumbing pipes, food packing material, goods for infants such as baby bottles and toys, fiber for textile, articles for interior decoration, receptacles for blood storage, etc. Such PVC has rigid property since the same has peculiar hierarchy structure inside molecule and microcrystallite functioning as physical crosslinks to allow the molecular movement to be restricted. Accordingly, flexibility should be given through the plasticization process to use PVC for the products requiring flexibility such as film for packing food. Flexible PVC is generally manufactured by adding plasticizer to PVC. Adding plasticizer improves the molecular movement of PVC to give flexibility to PVC.

There may be mentioned as plasticizer widely used for manufacturing flexible PVC, di[2-ethylhexyl]phthalate (DOP, hereinafter), dibutyl phthalate, dibenzyl phthalate, di[2-ethylhexyl] adipate, etc. They are all liquid plasticizer having low molecular weight. The reasons why such low molecular weight plasticizer has superior plasticization efficiency are as follows.

First, low molecular weight plasticizer accelerates the chain-end motion by increasing the number of end-group in a fixed volume to improve the molecular movement of PVC.

Second, low molecular weight plasticizer accelerates the main-chain motion by widening distance between the chains of PVC and deteriorating the interactivity therebetween to improve the molecular movement of PVC.

Third, the molecular movement of compound of PVC and plasticizer is improved since the chain of low molecular weight plasticizer is short to have good molecular movement.

By reason as described above, low molecular weight plasticizer is very useful for manufacturing flexible PVC. However, since low molecular weight plasticizer is liquid material, the same tends to volatilize into the air or to transfer to the outside through the contact with liquid or solid substance. When the plasticizer flowing out like this flows into the human's body, the animal, or the plant, the same strikes a fatal blow by hindering the normal activity of the endocrine system, which is directly concerned with the life activity or stirring the abnormal reaction. For this reason, the related organizations and the environmental protection organizations of all the countries of the world specifies the most of low molecular weight plasticizers for PVC as hindrance material to the endocrine system(also known as environmental hormone) and restricts or permits only temporarily the use of them.

Accordingly, the researches to develop plasticizer for PVC to substitute the low molecular weight plasticizer and not to flow out are progressed. Such researches are mostly about plasticizer formed of linear polymer, which does not flow out from the PVC goods.

For example, in U.S. Pat. No. 5,385,974, there is disclosed PVC plasticizer formed of vinyl acetate, ethylene oxide, and caprolactone copolymer having 1,500~1,000,000 of molecular weight. When such linear polymer is used as plasticizer of PVC, the problem of efflux of plasticizer as in case of the low molecular weight plasticizer does not occur. However, since the number of end-group of linear polymer is small, the improvement of the molecular movement due to the accelaration of chain-end motion is impossible. In addition, since chain entanglement occurs because of the property of linear polymer, the molecular movement is restrained. Accordingly, the plasticization efficiency is not good enough and therefore, the required flexibility is not sufficiently given to PVC.

SUMMARY OF THE INVENTION

It is an object of the present invention is to overcome the above-mentioned problems and to provide aliphatic polyester compound for PVC plasticizer, having highly branched structure, allowing to overcome problems such as the disturbance of endocrine system and the destruction of ecosystem due to the efflux of plasticizer and having superior compatibility with PVC and superior efficiency to plasticize, thereby giving PVC sufficient flexibility.

To achieve the above object, the present invention provides aliphatic polyester compound having highly branched structure formed by the self-condensation polymerization of α-carboxy-ω-2,2-[bis(hydroxymethyl)propanoate]polyester indicated in following chemical formula 1.

[Chemical Formula 1]

In the above chemical formula 1, m is an integer of 3 to 15 and the degree of polymerization n is an integer of 5 to 100.

In addition, to achieve the above object, the present invention provides aliphatic polyester compound having highly branched structure formed by the self-condensation polymerization of 2,2-bis(ω-hydroxy polyestermethyl) propionic acid indicated in following chemical formula 2.

[Chemical Formula 2]

In the above chemical formula 2, m is an integer of 3 to 15 and the degree of polymerization n is an integer of 5 to 100.

Aliphatic polyester compound having highly branched structure according to the present invention is formed by the self-condensation polymerization of monomer having one carboxy functional group and two hydroxy functional groups. Aliphatic polyester compound having highly branched structure according to the present invention has superior compatibility with PVC, does not flow out, and is not restrained in the molecular movement since the same has a large number of branches, so little chain entanglement occurs in comparison with linear polymer. In addition, since the inventive compound has a large number of terminal groups, the same has superior molecular movement. Further, since aliphatic polyester compound having highly branched structure according to the present invention has a three-dimensional semi-globular cubic molecular structure, the chain entanglement of PVC chain is prevented on blending with PVC, thereby improving the molecular movement of PVC. Accordingly, aliphatic polyester compound having highly branched structure according to the present invention gives PVC sufficient flexibility without flowing out.

Number average molecular weight of aliphatic polyester compound having highly branched structure according to the present invention is preferably 1,000~1,000,000.

It is another object of the present invention to provide flexible PVC blend harmless to humans, that can be used for manufacturing food and medical supplies packing material, goods for infants such as baby bottles and toys, receptacles for blood storage, etc.

To achieve another object, the present invention provides flexible PVC blend formed of 5~50 weight % of the aliphatic polyester compound having highly branched structure and 95~50 weight % of PVC.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

The detailed description of aliphatic polyester compound for PVC plasticizer, having highly branched structure according to the present invention and flexible PVC blend containing the same is provided hereinafter.

First, a method for manufacturing aliphatic polyester compound having highly branched structure according to the present invention is described.

Aliphatic polyester compound having highly branched structure according to the present invention is formed by self-condensation polymerization of monomer having one carboxy functional group and two hydroxy functional groups. A method for manufacturing aliphatic polyester compound having highly branched structure according to an embodiment of the present invention is as follows.

An aliphatic polyester compound having highly branched structure may be formed by self-condensation polymerization of α-carboxy-ω-2,2-[bis(hydroxymethyl)propanoate] polyester ($AB_2$-1, hereinafter) indicated with the following chemical formula 1.

[Chemical Formula 1]

In the above chemical formula 1, m is an integer of 3 to 15 and the degree of polymerization n is an integer of 5 to 100.

Here, self-condensation polymerization means that carboxy group and hydroxy group in $AB_2$-1 are bound by condensation reaction to generate ester bond and to be converted into polymer. At this moment, the condensation reaction can be made in one hydroxy functional group or two hydroxy functional groups of one $AB_2$-1 unit. For example, when the condensation reaction is made in one hydroxy functional group of $AB_2$-1 unit in a certain stage of the reaction, molecular structure indicated with the following chemical formula 3 is generated in the molecular structure of aliphatic polyester compound having highly branched structure.

[Chemical Formula 3]

In the above chemical formula 3, m is an integer of 3 to 15 and the degree of polymerization n is an integer of 5 to 100.

On the other hand, when the condensation reaction is made in two hydroxy functional groups of $AB_2$-1 unit in a certain stage of the reaction, molecular structure indicated with the following chemical formula 4 is generated in the molecular structure of aliphatic polyester compound having highly branched structure.

In the above chemical formula 4, m is an integer of 3 to 15 and the degree of polymerization n is an integer of 5 to 100.

Accordingly, since the more branches are generated as the number of $AB_2$-1 units of which the condensation reaction is made in two hydroxy functional groups increases, degree of branching of aliphatic polyester compound having highly branched structure obtained thereof can be high.

A method for manufacturing aliphatic polyester compound having highly branched structure according to another embodiment of the present invention is as follows.

[Chemical Formula 4]

The method for manufacturing aliphatic polyester compound having highly branched structure according to another embodiment is practically same as that described above. An aliphatic polyester compound having highly branched structure may be formed by self-condensation polymerization of 2,2-bis(ω-hydroxy polyestermethyl) propionic acid(AB$_2$-2, hereinafter) indicated with the following chemical formula 2.

[Chemical Formula 2]

In the above chemical formula 2, m is an integer of 3 to 15 and the degree of polymerization n is an integer of 5 to 100.

Here, self-condensation polymerization means that carboxy group and hydroxy group in AB$_2$-2 are bound by condensation reaction to generate ester bond and to be converted into polymer. At this moment, the condensation reaction can be made in one hydroxy functional group or two hydroxy functional groups of one AB$_2$-2 unit. For example, when the condensation reaction is made in one hydroxy functional group of AB$_2$-2 unit in a certain stage of the reaction, molecular structure indicated with the following chemical formula 5 is generated in the molecular structure of aliphatic polyester compound having highly branched structure.

[Chemical Formula 5]

In the above chemical formula 5, m is an integer of 3 to 15 and the degree of polymerization n is an integer of 5 to 100.

On the other hand, when the condensation reaction is made in two hydroxy functional groups of AB$_2$-2 unit in a certain stage of the reaction, molecular structure indicated with the following chemical formula 6 is generated in the molecular structure of aliphatic polyester compound having highly branched structure.

[Chemical Formula 6]

In the above chemical formula 6, m is an integer of 3 to 15 and the degree of polymerization n is an integer of 5 to 100.

Accordingly, since the more branches are generated as the number of $AB_2$-2 units of which the condensation reaction is made in two hydroxy functional groups increases, degree of branching of aliphatic polyester compound having highly branched structure obtained thereof can be high.

As in case of compound formed by self-condensation polymerization of $AB_2$-1 or $AB_2$-2 monomer, compound obtained by the self-condensation polymerization of monomer such as $AB_2$(A and B indicate respectively carboxy and hydroxy group) having one carboxy functional group and two hydroxy functional groups has semi-globular structure.

Figure 1:
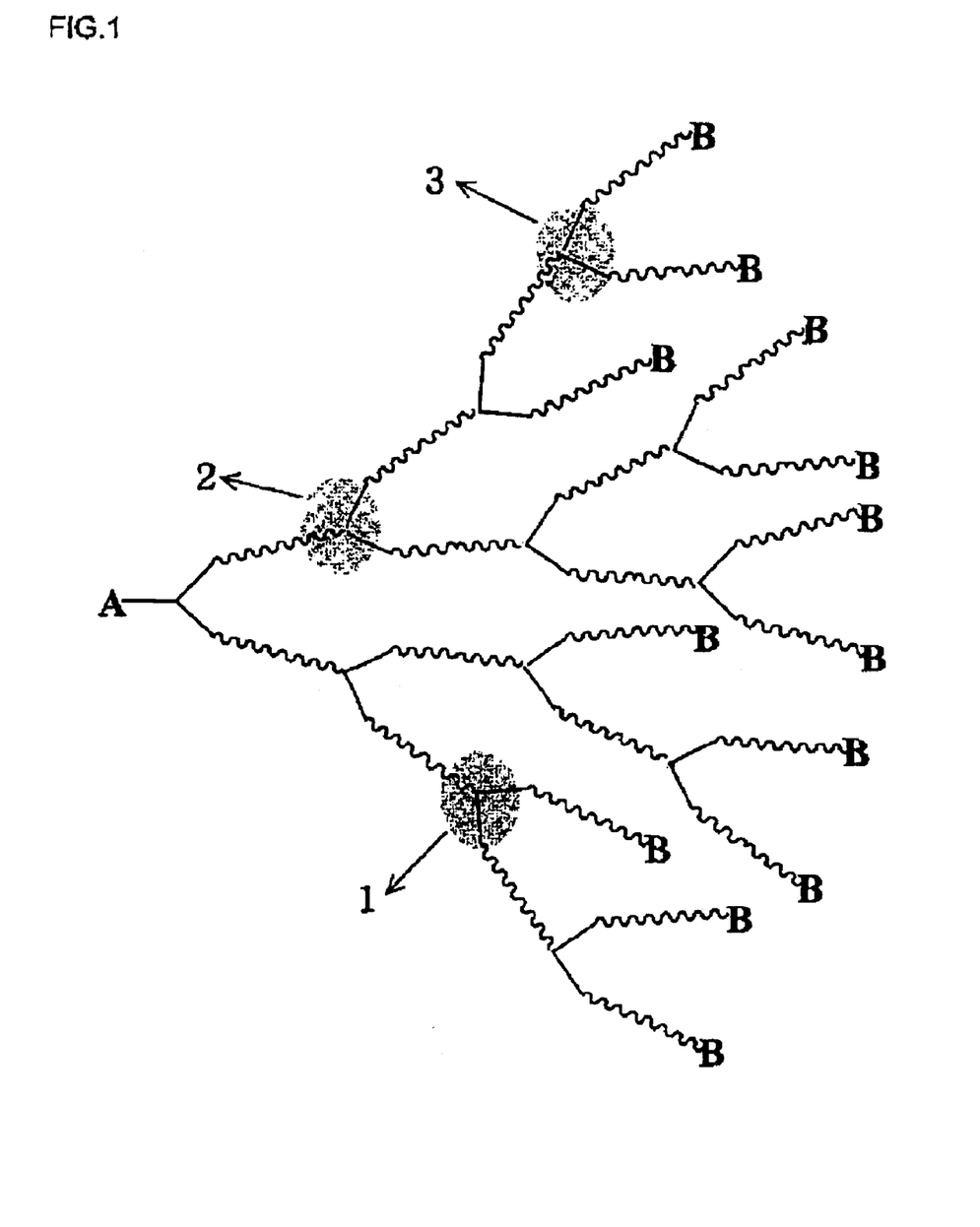
FIG. 1 is a schematic diagram describing features of aliphatic polyester compound having highly branched structure according to the present invention.

FIG. 1 is a schematic diagram describing features of aliphatic polyester compound having highly branched structure according to the present invention.

Referring to FIG. 1, there can be found that aliphatic polyester compound having highly branched structure comprises three main structural units. That is, aliphatic polyester compound having highly branched structure according to the present invention comprises linear unit 1, branched unit 2, and terminal unit 3. Since aliphatic polyester compound having highly branched structure according to the present invention has a large number of branched units 2, there is little chain entanglement in comparison with in case of linear polymer not to restrain the molecular movement. In addition, since the same has a large number of terminal units 3, the molecular movement is superior because of the chain-end motion. In addition, since aliphatic polyester compound having highly branched structure of the present invention has three-dimensional semi-globular cubic molecular structure, the chain entanglement of PVC chain is prevented on blending with PVC to improve the molecular movement of PVC. As described above, since aliphatic polyester compound having highly branched structure of the present invention has superior plasticization efficiency, it is possible to give sufficient flexibility to PVC contrary to the conventional plasticizer formed of linear polymer.

It is preferable that the degree of branching of aliphatic polyester compound having highly branched structure according to the present invention is 0.4~0.8 in consideration of the chain entanglement and the plasticization efficiency. The degree of branching indicates the ratio of branched structure among molecular structure and can be calculated from the following formula by using $^1$H-NMR spectroscopy data.

Degree of branching=[peak area on $^1$H-NMR spectrum originated in terminal unit/(peak area on $^1$H-NMR spectrum originated in terminal unit+peak area on $^1$H-NMR spectrum originated in linear unit)]

In addition, number average molecular weight of aliphatic polyester compound having highly branched structure according to the present invention is preferably 1,000~1,000,000 in consideration of the efficiency of synthesis and the efflux possibility of the same. Contrary to the conventional low molecular plasticizer, polymer such as aliphatic polyester compound having highly branched structure according to the present invention never flow out into the air or to the contacted liquid or solid substance.

As described above, since aliphatic polyester compound having highly branched structure has superior plasticization efficiency without defect of flowing out and furthermore has superior compatibility with PVC, the same is appropriate to be used as plasticizer of PVC. The blending ratios of PVC and aliphatic polyester compound having highly branched structure are preferably 95~50 weight % and 5~50 weight %, respectively, in consideration of the flexibility and the physical property of PVC blend.

The detailed description of the present invention referring to the embodiments is provided hereinafter. However, the embodiments according to the present invention can be modified in various ways and should not be understood to be restricted to the embodiments described below. The embodiments of the present invention are provided to more clearly and easily describe the present invention to a person who has standard knowledge in this technical area.

Monomer Synthesis of Aliphatic Polyester Compound Having Highly Branched Structure

SYNTHESIS EXAMPLE 1

The present synthesis example is to show a synthesis method of $AB_2$-1 containing poly(ε-caprolactone) in which the number of carbon of the repeat unit of linear polyester is 6, a kind of α-carboxy-ω-2,2-[bis(hydroxymethyl) propanoate]polyester($AB_2$-1).

1) Synthesis of 2,2-bis(phenyldioxymethyl)propionic acid 25.0 g (187 mmol) of bis-MPA, 42.6 g (280 mmol) of benzylaldehyde dimethyl acetal, 0.69 g (4 mmol) of para-toluene sulfonic acid, and 100 ml of acetone solvent are put in a three-necked round bottom flask and agitated at the normal temperature until the materials are completely dissolved. Then several drops of mixed solution in which 30% ammonium hydroxide and ethanol are mixed with each other in the proportion of 1 to 1 is added to proceed the reaction and 400 ml of methylene chloride is added to dilute the reactant. Next, the reactant is extracted by using 25 ml of distilled water and the organic layer is separated. The separated organic layer is concentrated by being distilled and recrystallized in methylene chloride. The obtained precipitate is filtered and dried to obtain 90% yield of 2,2-bis (phenyldioxymethyl)propionic acid.

2) Synthesis of α-benzoate-ω-hydroxy poly(ε-caprolactone)

2.16 g (20 mmol) of benzyl alcohol and 0.41 g (4 mmol) of cationic ring-opening polymerization catalyst, aluminium triisopropoxide are put in a three-necked round bottom flask mounted with a Dean-Stark trap. The generated isopropanol is removed by three times of azeotropic distillation with adding 20 ml of toluene into the flask, and then the reaction is made at 110° C. for 24 hours with adding each predetermined amount as described in the following table 1 of ε-caprolactone under nitrogen purging. The obtained reactant is precipitated in 800 ml of cold methanol and the precipitate is filtered and dried to obtain α-benzoate-ω-hydroxy poly(ε-caprolactone).

TABLE 1

| Classification | Amount of added ε-caprolactone | Number average molecular weight (g/mol) | Polydispersity | Reaction yield (%) |
|---|---|---|---|---|
| $AB_2$-1-a | 5.7 g (50 mmol) | 1170 | 1.20 | 79 |
| $AB_2$-1-b | 11.4 g (100 mmol) | 1810 | 1.21 | 82 |
| $AB_2$-1-c | 22.8 g (200 mmol) | 2795 | 1.31 | 88 |

Number average molecular weight, polydispersity, and reaction yield of α-benzoate-ω-hydroxy poly(ε-caprolactone) according to the amount of added ε-caprolactone monomer are described in table 1. Number average molecular weight and polydispersity are measured by a gel permeation chromatography(GPC) using polystyrene as standard material.

Referring to the above table 1, there can be found that the number average molecular weight of produced α-benzoate-ω-hydroxy poly(ε-caprolactone) increases in precise proportion to the increase of the amount of added ε-caprolactone monomer and the polydispersity of molecular weight of the product is very narrow. These are features when ε-caprolactone monomer is polymerized by using cationic ring-opening polymerization catalyst. Accordingly, it is possible to precisely regulate the length of linear poly(ε-caprolactone) chain forming aliphatic polyester compound having highly branched structure according to the present invention. That is, it is possible to give PVC the required degree of flexibility.

3) Synthesis of α-benzoate-ω-[2,2-bis(phenyldioxymethyl)propanoate] poly(ε-caprolactone)

5 g (1.67 mmol) of α-benzoate-ω-hydroxy poly(ε-caprolactone) obtained in above 2) and 5 ml of tetrahydrofuran solvent are pout in a three-necked round bottom flask and agitated. Next, solution obtained by dissolving 0.45 g (2.17 mmol) of 2,2-bis(phenyldioxymethyl)propionic acid obtained in above 1) and 0.87 g (3.33 mmol) of triphenylphosphine in tetrahydrofuran solvent is added and agitated. Then, 0.67 g (3.33 mmol) of diisopropylazodicarboxylate is added to the above reactant and the reaction is made for 12 hours. The obtained reactant is precipitated in cold methanol, filtered, and dried to obtain α-benzoate-ω-[2,2-bis(phenyloxymethyl)propanoate] poly(ε-caprolactone) (yield 80%).

4) Synthesis of α-carboxy-ω-[2,2-bis(hydroxymethyl)propanoate] poly(ε-caprolactone)

4 g of α-benzoate-ω-[2,2-bis(phenyloxymethyl)propanoate] poly(ε-caprolactone) obtained in 3), 10mol of tetrahydrofuran solvent, and 40 ml of ethylacetate are put in a one-necked round bottom flask and agitated till the material is completely dissolved. 0.4 g of 10% palladium catalyst in an absorbed form onto activated carbon is put in the solution obtained above and then, 3-directional cock to one direction of which a balloon containing hydrogen gas is connected and to another direction of which a pump for making the flask vacuous is connected is connected to flask. The process that the flask is made vacuous by the pump and then filled with hydrogen gas by the balloon is repeated three times to change the air in the flask into the hydrogen gas and then the reaction is made for 24 hours with intensely agitating the material in the flask. The reactant obtained like this is filtered, palladium catalyst is removed, and the reactant is precipitated in cold methanol. The precipitate obtained like this is filtered, washed twice by methanol, and dried to obtain $AB_2$-1 type of monomer, α-carboxy-ω-[2,2-bis(hydroxymethyl)propanoate] poly(ε-caprolactone)(yield 88%).

SYNTHESIS EXAMPLE 2

The present synthesis example is to show a synthesis method of $AB_2$-2 containing poly(ε-caprolactone) in which the number of carbon of the repeat unit of linear polyester is 6, a kind of 2,2-bis(ω-hydroxy polyestermethyl)propionic acid($AB_2$-2).

1) Synthesis of 2,2-bis(hydroxymethyl)propyl benzoate 9 g (67 mmol) of bis-MPA, 4.3 g (77 mmol) of sodium hydroxide, and 50 ml of N,N-dimethylformamide solvent are put in a three-necked round bottom flask. Then, temperature increases up to 100° C. and the material in the flask is agitated for an hour to be completely dissolved. Next, 13.8 g (80 mmol) of benzylbromide is gradually added and the reaction is made for 20 hours. After the end of reaction, the solvent in the reactant is evaporated, the residue is dissolved by 200 ml of diethylether, material not reacted is removed by extracting three times through 100 ml of distilled water, and the solvent is evaporated to obtain solid reactant. 85% yield of 2,2-bis(hydroxymethyl)propyl benzoate is produced by recrystallizing the obtained solid reactant by toluene.

2) Synthesis of 2,2-bis[ω-hydroxy poly(ε-caprolactone)methyl]propyl bezoate 2.24 g (10 mmol) of 2,2-bis(hydroxymethyl)propyl benzoate obtained in the above 1) and 0.41 g (4 mmol) of cationic ring-opening polymerization catalyst, aluminium triisopropoxide are put in a three-necked round bottom flask mounted with a Dean-Stark trap. The generated isopropanol is removed by three times of azeotropic distillation by adding 20 ml of toluene into the flask, and then the reaction is made at 110° C. for 24 hours with adding each predetermined amount as described in the following table 2 of ε-caprolactone under nitrogen purging. The obtained reactant is precipitated in 800 ml of cold methanol and the precipitate is filtered and dried to obtain 2,2-bis[ω-hydroxy poly(ε-caprolactone)methyl]propyl benzoate.

TABLE 2

| Classification | Amount of added ε-caprolactone | Number average molecular weight (g/mol) | Polydispersity | Reaction yield (%) |
|---|---|---|---|---|
| $AB_2$-2-a | 5.7 g (50 mmol) | 1105 | 1.22 | 82 |
| $AB_2$-2-b | 11.4 g (100 mmol) | 1760 | 1.18 | 88 |
| $AB_2$-2-c | 22.8 g (200 mmol) | 2815 | 1.21 | 84 |

Number average molecular weight, polydispersity, and reaction yield of 2,2-bis[ω-hydroxy poly(ε-caprolactone)methyl]propyl benzoate according to the amount of added ε-caprolactone monomer are described in table 2. Number average molecular weight and polydispersity are measured by a gel permeation chromatography(GPC) using polystyrene as standard material.

Referring to the above table 2, there can be found that the number average molecular weight of produced 2,2-bis[ω-hydroxy poly(ε-caprolactone)methyl]propyl benzoate increases in precise proportion to the increase of the amount of added ε-caprolactone monomer and the polydispersity of molecular weight of the product is very narrow. These are features when ε-caprolactone monomer is polymerized by using cationic ring-opening polymerization catalyst. Accordingly, it is possible to precisely regulate the length of linear poly(ε-caprolactone) chain forming aliphatic polyester compound having highly branched structure according to the present invention. That is, it is possible to give PVC the required degree of flexibility.

3) Synthesis of 2,2-bis[ω-hydroxy poly(ε-caprolactone)methyl] propionic acid 4 g of 2,2-bis[ω-hydroxy poly(ε-caprolactone)methyl]propyl benzoate obtained in 2), 10ml of tetrahydrofuran solvent, and 40 ml of ethylacetate are pout in a one-necked round bottom flask and agitated till the material is completely dissolved. 0.4 g of 10% palladium catalyst in an absorbed form onto activated carbon is put in the solution obtained above and then, 3-directional cock to one direction of which a balloon containing hydrogen gas is connected and to another direction of which a pump for making the flask vacuous is connected is connected to the flask. The process that the flask is made vacuous by the pump and then filled with hydrogen gas by the balloon is repeated three times to change the air in the flask into the hydrogen gas and then the reaction is made for 24 hours with intensely agitating the material in the flask. The reactant obtained like this is filtered, palladium catalyst is removed, and the reactant is precipitated in cold methanol. The precipitate obtained like this is filtered, washed twice by methanol, and dried to obtain $AB_2$-2 type of monomer, 2,2-bis[ω-hydroxy poly(ε-caprolactone)methyl]propionic acid(yield 92%).

Synthesis of Aliphatic Polyester Compound Having Highly Branched Structure

Embodiment 1

The present embodiment is to describe a synthesis of aliphatic polyester compound having highly branched structure by self-condensation polymerization of α-carboxy-ω-2,2-[bis(hydroxymethyl)propanoate]polyester($AB_2$-1) monomer indicated with the above chemical formula 1.

First, 1.0 mmol of α-carboxy-ω-2,2-[bis(hydroxymethyl) propanoate]poly(ε-caprolactone) and 9 ml of methylene chloride solvent are put in a three-necked round bottom flask and agitated till the material in the flask is dissolved. Next, solution obtained by dissolving 48.0 mg (0.15 mmol) of 4-(dimethylamino)pyridinium 4-toluene sulfonate in methylene chloride is added. Above catalyst, 4-(dimethylamino) pyridium 4-toluene sulfonate is produced by the following method. First, 4.75 g (25 mmol) of para-toluene sulfonic acid monohydrate is put in a three-necked round bottom flask mounted with Dean-Stark trap and then water is removed by three times of azeotropic distillation with adding 20 ml of benzene solvent into the flask, thereby obtaining para-toluene sulfonic acid anhydride. Solution obtained by dissolving 3.05 g (25 mmol) of dimethylaminopyridine in warm benzene solvent is added to the para-toluenesulfonicacid anhydride and sufficiently agitated. Next, the produced solid reactant is filtered and recrystallized by anhydrous dichloroethane solvent to obtain 4-(dimethylamino)pyridium 4-toluene sulfonate.

Here, 0.30 g (1.50 mmol) of dicyclohexyl carbodiimide is added and then self-condensation polymerization is made for 48 hours. The reactant obtained like this is precipitated by cold methanol, filtered, and dried to obtain aliphatic polyester compound having highly branched structure. The kind of used $AB_2$ typed monomer and number average molecular weight, polydispersity, degree of branching, reaction yield, and glass transition temperature Tg of aliphatic polyester compound having highly branched structure are described in the following table 3.

TABLE 3

| Used monomer | Number average molecular weight (g/mol) | Poly-dispersity | Degree of branching | Tg (° C.) | Reaction yield (%) |
|---|---|---|---|---|---|
| $AB_2$-1-a | 17780 | 2.57 | 0.60 | −68 | 89 |
| $AB_2$-1-b | 15695 | 2.43 | 0.55 | −61 | 86 |
| $AB_2$-1-c | 12360 | 2.11 | 0.52 | −59 | 80 |

In the above table 3, the degree of branching is calculated by the following formula according to $^1$H-NMR spectroscopy data obtained by using a method proposed in Acta polymerica, 1997, 48, 30 "Degree of Branching in Hyperbranched Polymers" (D. Hoelter, a. Burgath, and H. Frey).

Degree of branching=[peak area on $^1$H-NMR spectrum originated in terminal unit/(peak area on $^1$H-NMR spectrum originated in terminal unit+peak area on $^1$H-NMR spectrum originated in linear unit)]

Embodiment 2

The present embodiment is to describe a synthesis of aliphatic polyester compound having highly branched structure by self-condensation polymerization of 2,2-bis(ω-hydroxy polyestermethyl)propionic acid($AB_2$-2) monomer indicated with the above chemical formula 2.

The synthesis is made by the same method as that of the embodiment 1 except that instead of α-carboxy-ω-[2,2-bis (hydroxymethyl)propanoate] poly(ε-caprolactone) of the embodiment 1, 2,2-bis[ω-hydroxy poly(ε-caprolactone) methyl]propionic acid obtained according to the synthesis example 2 is used. The kind of used $AB_2$ typed monomer and number average molecular weight, degree of polydispersity, degree of branching, reaction yield, and glass transition temperature Tg of aliphatic polyester compound having highly branched structure are described in the following table 4.

TABLE 4

| Used monomer | Number average molecular weight (g/mol) | Poly-dispersity | Degree of branching | Tg (° C.) | Reaction yield (%) |
|---|---|---|---|---|---|
| $AB_2$-2-a | 11265 | 2.28 | 0.60 | −66 | 91 |
| $AB_2$-2-b | 9120 | 2.05 | 0.55 | −64 | 87 |
| $AB_2$-2-c | 8662 | 1.92 | 0.52 | −61 | 88 |

Referring to the above table 4, the physical property of aliphatic polyester compound having highly branched structure obtained according to the embodiment 2 is similar to that of aliphatic polyester compound having highly branched structure of the embodiment 1. It is because the structures of monomers used in the embodiments 1 and 2 are very similar to each other.

Manufacture of Flexible Polyvinylchloride Blend

Embodiments 3~4

The present embodiments are to describe a method for manufacturing flexible PVC blend by using aliphatic polyester compound having highly branched structure produced as plasticizer. Flexible PVC blend is manufactured by a solution blending method using tetrahydrofuran as solvent.

Embodiment 3

Aliphatic polyester compound having highly branched structure(HBPE, hereinafter) obtained according to the embodiment 1 is mixed with commercial PVC (manufactured by emulsion polymerization, number average molecular weight: 20,000, polydispersity: 1.5, Tg:83° C., and the rest is same) at the weight ratio(HBPE:PVC) of 1:9, 2:8, 3:7, 4:6, and 5:5 to obtain a mixture of which total weight is 50 g. Next, tetrahydrofuran solvent is added and the mixture is agitated for 48 hours to obtain transparent solution. The solvent of the obtained transparent solution is evaporated for 24 hours in a hood and then, gradually evaporated again for 48 hours in a vacuous oven with maintaining the normal temperature, thereby obtaining flexible PVC/HBPE blend.

Embodiment 4

Flexible PVC/HBPE blend is manufactured by the same method as that of the embodiment 3 except that instead of aliphatic polyester compound having highly branched structure obtained according to the embodiment 1, aliphatic polyester compound having highly branched structure obtained according to the embodiment 2 is used.

Embodiments 5~6

The present embodiments are to describe a method for manufacturing flexible PVC blend by using aliphatic polyester compound having highly branched structure produced as plasticizer. Flexible PVC blend is manufactured by a melt blending method using an internal blender of batch operation.

Embodiment 5

Aliphatic polyester compound having highly branched structure obtained according to the embodiment 1 is mixed with commercial PVC at the weight ratio(HBPE:PVC) of 1:9, 2:8, 3:7, 4:6, and 5:5 to obtain a mixture of which total weight is 50 g. Next, thermal stabilizer is added(The amount of thermal stabilizer is 1% on the basis of total weight of the mixture). Then, the mixture is mixed for 7 minutes at 180° C. by using the internal blender of batch operation at 100 rpm and left at the normal temperature to obtain flexible PVC/HBPE blend.

Embodiment 6

Flexible PVC/HBPE blend is manufactured by the same method as that of the embodiment 5 except that instead of aliphatic polyester compound having highly branched structure obtained according to the embodiment 1, aliphatic polyester compound having highly branched structure obtained according to the embodiment 2 is used.

COMPARATIVE EXAMPLE 1

Flexible PVC blend is manufactured by the same method as that of the embodiment 3 except that instead of aliphatic polyester compound having highly branched structure obtained according to the embodiment 1, linear polymer, linear poly(ε-caprolactone)(number average molecular weight 80,000, product number 44,074-4 manufactured by Aldrich Chemical, Co.) is used and the mixture ratio of PVC blend is regulated into the ratio known as the most efficient ratio: 70 weight % of PVC and 30 weight % of poly(ε-caprolactone).

COMPARATIVE EXAMPLE 2

In the present comparative example, flexible PVC is manufactured by using diisooctylphthalate(DOP) that is one of the commonly used liquid plasticizers having low molecular weight and widely used for a criterion to compare the efficiency of the plasticizer for PVC.

First, 100 g of commercial PVC, 60 g of commercial DOP, 2 g of thermal stabilizer, and 5 g of epoxydized soybean oil are mixed with each other and agitated to manufacture typical plastisol. Then, the pre-treatment is made by removing air in the plastisol by vacuum and leaving the plastisol at a normal temperature for 7 days. Next, the pre-treated resultant material is hardened at 190° C. in an oven to obtain flexible PVC.

Tg of PVC Blend

The Tg of PVC/HBPE blends manufactured according to the embodiment 4 and the comparative examples 1 and 2 is measured by a differential scanning calorimeter(DSC) and the results are described in table 5.

TABLE 5

| Classification | Embodiment 4 | Comparative example 1 | Comparative example 2 | PVC not mixed with plasticizer |
|---|---|---|---|---|
| Mixture ratio of PVC:plasticizer (weight %) | 5:5 | 7:3 | 7:3 | 5:3 |
| Tg (° C.) | −35 | −25 | 12 | −35 | 83 |

Referring to the above table 5, there can be found that the Tg of PVC blend of the embodiment 4 containing aliphatic polyester compound having highly branched structure according to the present invention is lowered mostly equally to that of PVC blend of the comparative example 2 using liquid plasticizer having low molecular weight. On the contrary, the Tg of PVC blend of the comparative example 1 using linear polymer as a plasticizer is not sufficiently lowered.

Tensile Property of PVC Blend

For the tensile test of PVC/HBPE blend manufactured according to the embodiment 3 and the comparative examples 1 and 2, dumb-bell test specimens are manufactured having 15.5 mm of gauge length according to D638-91 of American Society for Testing and Materials(ASTM). Then, the load applied to the test specimen is measured by mounting 1000N of load cell and straining the test specimen at 150 mm/minute of crosshead speed by using the universal testing machine(UTM) of Lloyd Instruments LTD. having an apparatus name of LR 10 K. The obtained strain-stress curve is described in FIG. 2.

Figure 2:
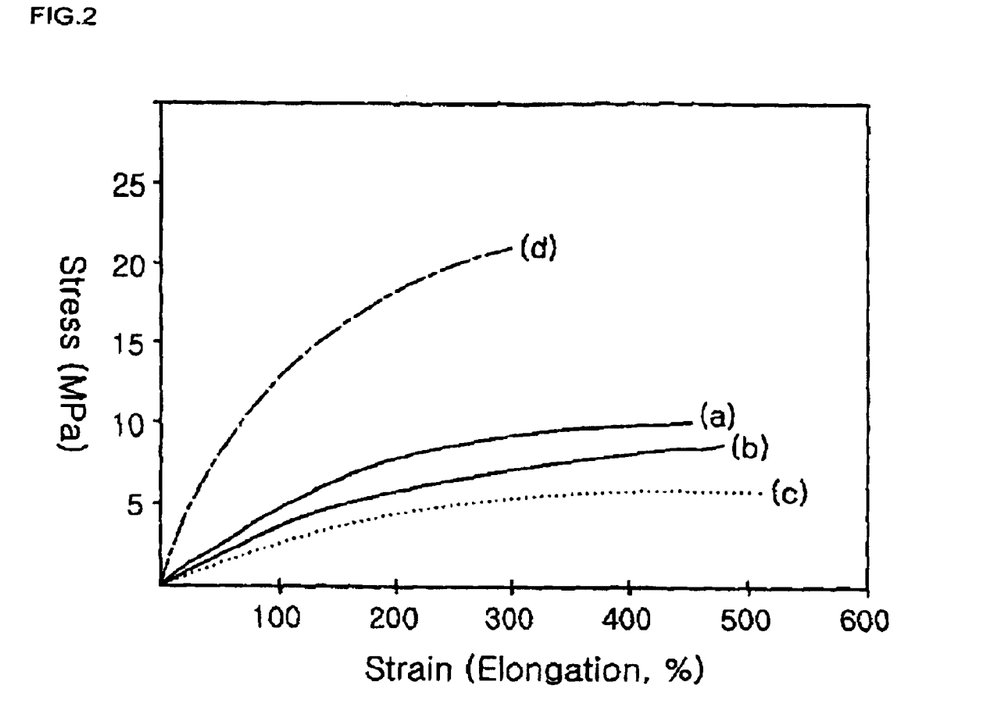
FIG. 2 is a graph of strain-stress curves showing a result of the strain test of test specimens of flexible PVC blend according to the present invention and the conventional flexible PVC blend.

In FIG. 2, (a) is a strain-stress curve of PVC blend test specimen in which the mixing ratio(weight %) of PVC/HBPE is 7:3 and (b) is in case of 5:5. Further, (c) is a strain-stress curve of PVC blend test specimen according to the comparative example 2 and (d) is a curve thereof according to the comparative example 1.

Referring to FIG. 2, there can be found that the maximum tensile rate of PVC blend containing aliphatic polyester compound having highly branched structure according to the present invention is superior to that of PVC blend containing linear polymer as plasticizer and almost exactly similar to that of PVC blend containing liquid plasticizer having low molecular weight. Especially, the test specimen having 5:5 of mixture ratio of PVC/HBPE(b) has the largest maximum tensile rate. Accordingly, there can be found that aliphatic polyester compound having highly branched structure according to the present invention is appropriate to be used as a plasticizer for giving PVC flexiability.

Test for Suitability to Ecosystem of PVC Blend

To compare the suitability to ecosystem of PVC blend containing aliphatic polyester compound having highly branched structure according to the present invention with that of PVC blend containing liquid plasticizer having low molecular weight, the volatility into the air, the solvent extractability, the migration to a solid contact substance, and the food adulteration of plasticizers contained in PVC blends according to the embodiments and the comparative examples are measured according to the following standard and described in the following tables 6 and 7.

Test for Volatility into the Air

The volatility test for PVC blends of the embodiment 5 and the comparative example 2 is made according to D1203-

89 of American Society for Testing and Materials(ASTM). First, a square test specimen having 0.40 mm of thickness, 50 mm of width, and 50 mm of length is left for more than 20 hours at the room temperature with keeping 50% or so of relative humidity. Then, The test specimen is laid in a container in which 120cm³ of activated carbon is spread and covered with 120cm³ of activated carbon. The container is put in a vacuous oven and left for 72 hours at the normal temperature. Next, the container is took out and left for more than 20 hours at the room temperature with keeping 50% or so of relative humidity. The volatility into the air of plasticizer contained in the PVC blend test specimen is calculated by the following formula.

Weight decrease rate(%)=[($W_1$-$W_2$)/$W$]×100

W: weight of plasticizer mixed in each test specimen
$W_1$: total weight of test specimen before the volatility test
$W_2$: total weight of test specimen after the volatility test Referring to table 6, the plasticizer of PVC blend according to the embodiment 5 containing HBPE according to the present invention is never volatilized into the air, while the considerable amount of plasticizer of PVC blend according to the comparative example 2 containing the conventional liquid plasticizer, DOP is volatilized.

Solvent Extractability Test

A square test specimen is made by PVC blends manufactured according to the embodiment 4 and the comparative example 2 according to the same method as that used in the volatility test. The test specimen is immersed in a large amount of normal nucleic acid solvent and left for 7 days at 50° C. The weight of the test specimen before the test $W_1$ and the weight thereof after the test $W_2$ are measured. Then, the solvent extractability of plasticizer contained in each test specimen is calculated by the formula for weight decrease rate described above.

Referring to table 6, the plasticizer of PVC blend according to the embodiment 4 containing HBPE according to the present invention is never extracted into normal nucleic acid solvent, while the most of plasticizer of PVC blend containing the conventional liquid plasticizer, DOP is extracted.

Test for Migration to a Solid Contact Substance

A square test specimen is made by PVC blend manufactured according to the embodiment 3 and the comparative example 2 according to the same method as that used in the volatility test. This test specimen is inserted between square test specimens, made by pure PVC not plasticized, having 1 mm of thickness, 70 mm of width, and 70 mm of length. Then, the test specimens are left for 10 days in condition that 10 psi of pressure is applied. The weight of the test specimen before the test $W_1$ and the weight thereof after the test $W_2$ are measured. Then, the migration to a solid contact substance of plasticizer contained in each test specimen is calculated by the formula for weight decrease rate described above.

Referring to table 6, the plasticizer of PVC blend according to the embodiment 3 containing HBPE according to the present invention is never migrated to pure PVC, while the considerable amount of plasticizer of PVC blend containing the conventional liquid plasticizer, DOP is migrated to the contacted pure PVC test specimen.

TABLE 6

| Kind of plasticizer | Mixture ratio of plasticizer (weight %) | Volatiltity (weight decrease rate, %) | Extractability (weight decrease rate, %) | Migration (weight decrease rate, %) |
|---|---|---|---|---|
| HBPE | 30 | 0 | 0 | 0 |
|  | 50 | 0 | 0 | 0 |
| DOP | 35 | 24.8 | 92.4 | 5.2 |

Measurement of Food Adulteration

Containers is made by piling up two sheets of square test specimens, having 0.1 mm of thickness, 100 mm of width, and 100 mm of length, made by PVC blend manufactured according to the embodiment 4 and the comparative example 2.30 g of each food described in table 7 is put in this container and the container is sealed and left for 15 days at the normal temperature. The weight of the test specimen before the test $W_1$ and the weight thereof after the test $W_2$ are measured. Then, the food adulteration of plasticizer contained in each test specimen is calculated by the formula for weight decrease rate described above.

TABLE 7

| Kind of plasticizer | Mixture ratio of plasticizer (weight %) | (weight decrease rate, %) | | |
|---|---|---|---|---|
|  |  | cheese | sausage | Chinese noodles |
| HBPE | 30 | 0 | 0 | 0 |
|  | 50 | 0 | 0 | 0 |
| DOP | 35 | 5.2 | 14.2 | 1.2 |

Referring to table 7, the plasticizer of PVC blend according to the embodiment 4 containing HBPE according to the present invention never adulterate food, while the plasticizer of PVC blend containing the conventional liquefied low molecule plasticizer, DOP considerably adulterates food.

As described above, since flexible PVC blend plasticized by HBPE according to the present invention does not have the defect of plasticizer efflux contrary to flexible PVC blend plasticized by the conventional liquefied low molecule plasticizer, the problems such as the disturbance of endocrine system of human body and the destruction of ecosystem due to the efflux of plasticizer.

Test for Adhesion Property of PVC Blend

Two square sheets, having 0.40 mm of thickness, 20 mm of width, and 100 mm of length, made by PVC blend manufactured according to the embodiments 3 and 4 and the comparative example 2 are laid one on top of the other and left for 24 hours at 50° C. in condition that 10 psi of pressure is applied. Then, stress required to separate two sheets adhered to each other is measured to test the adhesion property of PVC blend. The used method for measuring stress is peel test. The end portions of the test specimen that is formed of two sheets adhered to each other are separated from each other and perpendicularly folded so that the end portions of two sheets forms an angle of 180°. Then, the load applied to the test specimen is measured by mounting 100N of load cell on the separated end portions of two sheets and straining the test specimen at 150 mm/minute of crosshead speed by using the universal testing machine(UTM) of Lloyd Instruments LTD. having an apparatus name of LR10K.

Referring to stress-deformation rate measurement data obtained from the peel test, there is no noticeable difference between stress required to separate the test specimen formed of flexible PVC blend of the embodiments 3 and 4 containing HBPE according to the present invention and that required to separate the test specimen formed of flexible PVC blend of the comparative 2 containing liquid plasticizer, DOP.

As described above, aliphatic polyester having highly branched structure according to the present invention is polymer having superior compatibility with PVC and has no defect of plasticizer efflux. In addition, since the same has three-dimensional cubic molecular structure comprising a large number of end groups and branches, the plasticization efficiency of improving movement of molecule of PVC is superior. Accordingly, PVC blend containing aliphatic polyester having highly branched structure according to the present invention has superior flexibility and does not cause the problems such as the disturbance of endocrine system of human body and the destruction of ecosystem due to the efflux of plasticizer contrary to the conventional liquid plasticizer having low molecular weight.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A PVC blend comprising 5 to 50 weight % of an aliphatic polyester compound and 95 to 50 weight % of PVC, wherein the aliphatic polyester compound is produced by self-condensation polymerization of an α-carboxy-ω-2,2-(bis(hydroxymethyl)propanoate)polyester having the following formula:

wherein m is an integer of 3 to 15 and the degree of polymerization n is an integer of 5 to 100.

2. A PVC blend comprising 5 to 50 weight % of an aliphatic polyester compound and 95 to 50 weight % of PVC, wherein the aliphatic polyester compound is produced by self-condensation polymerization of the following acid:

wherein m is an integer of 3 to 15 and the degree of polymerization n is an integer of 5 to 100.

3. The aliphatic polyester compound according to claim 1, wherein number average molecular weight of the aliphatic polyester compound is 1,000 to 1,000,000.

4. The aliphatic polyester compound according to claim 2, wherein number average molecular weight of the aliphatic polyester compound is 1,000 to 1,000,000.

5. The aliphatic polyester compound according to claim 1, wherein the degree of branching of the aliphatic polyester compound is 0.4 to 0.8.

6. The aliphatic polyester compound according to claim 2, wherein the degree of branching of the aliphatic polyester compound is 0.4 to 0.8.

7. A PVC blend comprising an aliphatic polyester compound and PVC, wherein the aliphatic polyester compound is produced by self-condensation polymerization from one of the following compounds:

or wherein m is an integer of 3 to 15 and the degree of polymerization n is an integer of 5 to 100.

* * * * *